Nov. 12, 1963  M. F. BECHTOLD  3,110,589
MOLYBDENUM-TITANIUM-SILICON-NITROGEN PRODUCTS
AND PROCESS FOR MAKING SAME
Filed July 31, 1961
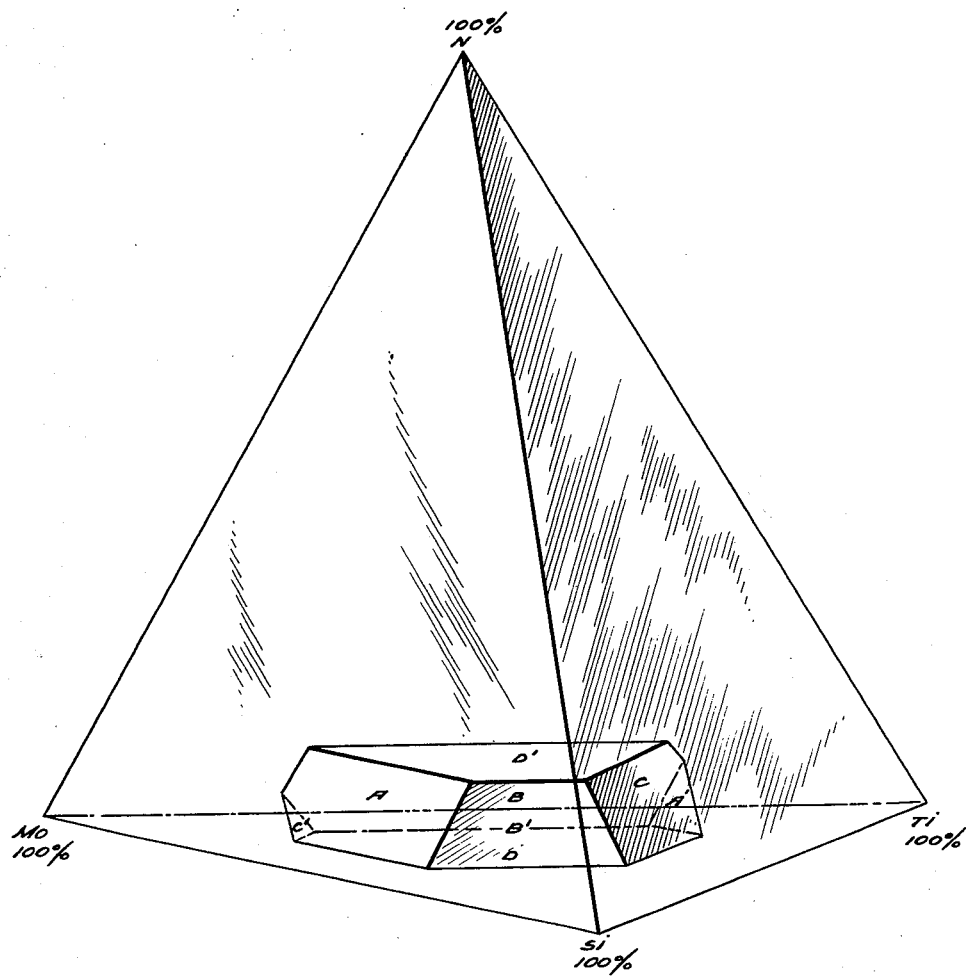
INVENTOR
MAX F. BECHTOLD,
BY *Frederick Schafer*
ATTORNEY United States Patent Office 3,110,589
Patented Nov. 12, 1963

1

3,110,589
MOLYBDENUM-TITANIUM-SILICON-NITROGEN PRODUCTS AND PROCESS FOR MAKING SAME
Max F. Bechtold, Kennett Square, Pa., assignor to E. I. du Pont de Nemours and Company, Wilmington, Del., a corporation of Delaware
Filed July 31, 1961, Ser. No. 128,264
10 Claims. (Cl. 75—175.5)

This invention relates to novel compositions of matter containing molybdenum, nitrogen, silicon and titanium; to articles of manufacture (i.e., shaped objects) prepared therefrom which are hard, strong, creep-resistant and resistant to oxidation even at high temperatures; and to methods for preparing such articles.

This application is a continuation-in-part of application S.N. 773,087, filed November 10, 1958, now abandoned.

Much effort has been expended in search of materials that are resistant to degradation at elevated temperatures. Although many silicides, such as molybdenum disilicide, possess good oxidation resistance at high temperature, these silicides are extremely brittle, creep rapidly under load at 1400–1500° C. and are therefore unsuitable for use as structural materials. Modified molybdenum-silicon alloys have been described, for example, in Austrian Patent No. 181,431, which refers to molybdenum-silicon alloys containing up to 45% of one or more of the high melting transition metals of the 4th, 5th and 6th groups of the periodic system, such as titanium, zirconium, vanadium, niobium, and tungsten. These transition metals may be completely or partially replaced by their compounds such as nitrides, borides, silicides and oxides. However, in this very general description of molybdenum-silicon alloys with elements comprising a substantial fraction of the periodic table, no molybdenum-silicon-titanium-nitrogen composition is described nor are any materials primarily useful in structural applications disclosed.

It is an object of this invention to provide novel compositions of matter containing molybdenum, nitrogen, silicon and titanium, including untreated, fired and melt-cast compositions of these elements. Another object of the invention is to provide articles or shaped objects prepared either by firing or melt-casting shaped but otherwise untreated compositions, or by machining or otherwise shaping previously fired or melt-cast compositions. A still further object is to provide novel methods for preparing the aforesaid fired or melt-cast compositions and articles. Thus, the overall object of the invention is to furnish structural materials containing molybdenum, nitrogen, silicon and titanium in certain proportions which endow such structural materials with heretofore unobtainable combinations of properties.

Such structural materials are readily prepared from an untreated composition of matter in which molybdenum, nitrogen, silicon and titanium are present (on the basis of elemental analysis) in the proportions (by weight) of 14–65% Mo, 1–12% N, 14–45% Si, and 15–59% Ti.

The fired and melt-cast compositions of the invention are those containing molybdenum, nitrogen, silicon and titanium in the same proportions as in the untreated composition. Element(s) or compound(s) in addition to molybdenum, nitrogen, silicon and titanium may be present in the fired or melt-cast composition, and thus in the untreated compositions, provided they are not substantially subversive of the properties desired in the fired or melt-cast compositions or shaped objects, i.e., excellent impact strength as well as good oxidation resistance, good creep resistance, good transverse rupture strength and high hardness at elevated temperatures. It will be understood by those skilled in the art that various impurities (i.e., elements other than molybdenum, nitrogen, silicon and titanium) which are present in minor amounts in the commercially available starting materials can be tolerated, as can added amounts of other element(s) and compound(s) which will not affect one or more of the desired properties, to a degree sufficient to make the fired or melt-cast compositions undesirable as structural materials for high temperature applications. Of course, there may be added such amounts of element(s) and/or compound(s) which will impart to the compositions, in an anticipated manner, various properties that are desirable for special applications without substantially affecting their utility as high temperature structural materials.

The fired and melt-cast compositions and shaped objects of the invention possesses impact strengths greater than those of any known commercial materials suitable for prolonged use above 1000° C. Thus, the products of the invention may be described as fired and melt-cast compositions and objects containing molybdenum, nitrogen, silicon and titanium in proportions referred to above and which have excellent impact strengths as well as good oxidation resistance, good creep resistance, high hardness and good transverse rupture strength at temperatures above 1000° C. Preferred products are those thus described having an impact strength of at least 10 ft. lbs./sq. in. at 25° C. and transverse rupture strength of at least 20,000 p.s.i. at 1250° C.

It is to be understood that minor changes in the relative proportions of the essential elements will occur when the untreated compositions are converted to fired or melt-cast compositions or objects due to the elimination of expendable impurities in the starting materials as well as the loss of inconsequential amounts of nitrogen. However, for simplicity of expression and ease of understanding, the proportions of essential elements in the untreated compositions and in the product compositions and objects are hereafter referred to in terms of the same numerical values.

The compositions of this invention are illustrated in the attached drawing by means of a regular tetrahedron representing all possible combinations of the four elements, molybdenum, nitrogen, silicon and titanium.

The distance from any one of the apexes of the tetrahedron to the opposite face measured along a line perpendicular to the face represents the weight percentage of the element designated, the 100% value being at the apex and 0% at the face. Thus, compositions containing any desired percentage of the element in question can be represented by the intersection with the tetrahedron of a plane perpendicular to the stated line at the given percentage and parallel to the 0% face. The volume bounded by a number of such planes represents products having percentage compositions within the ranges for which the planes have been constructed. In particular, the eight-sided volume illustrated, represents the products of the present invention. The faces of this volume are related to the percentage limits stated above as follows: A, 15% Ti; A′, 59% Ti; B, 14% Si; B′, 45% Si, C, 14% Mo; C′, 65% Mo; D, 1% N; D′, 12% N.

Although all fired as well as melt-cast compositions (sometimes hereinafter referred to as converted compositions) falling within the ranges described above possess desirable high temperature properties, certain of these compositions are particularly outstanding with respect to one or more specific high temperature properties. For example, compositions containing 20–50% Mo, 1–8% N, 14–45% Si, and 25–50% Ti are especially useful because of their superior oxidation resistance. When objects possessing both high stability in air and outstanding high temperature strength properties are desired, compositions containing 30–45% Mo, 1–5% N, 15–25% Si, and 30–45% Ti are preferred.

Since the converted compositions and thus objects composed thereof possess impact strengths greater than those of any known commercial materials suitable for prolonged use in air above 1000° C., they are suitable for use in cutting tools, heating elements and in structural elements used at high temperatures such as turbine buckets and other parts of propulsion engines.

Fired and melt-cast compositions which have been examined by X-ray and metallographic techniques are composed of several phases. It is not known whether all such objects within the above-defined composition ranges contain these phases or whether presence of these phases is essential. However, it is believed that the identities and interrelationships of these phases are responsible for the outstanding properties observed. All objects examined have contained titanium nitride in highly dispersed form in a silicide matrix. In some objects, the matrix is a combination of molybdenum disilicide and a ternary silicide shown by X-ray examination to correspond to $(Mo, Ti)_5Si_3$, where (Mo, Ti) indicates that molybdenum and titanium can be present in any relative proportions. In other objects, the molybdenum disilicide occurs as a second dispersed phase. A ternary disilicide phase, $(Mo, Ti)Si_2$, is also sometimes observed. When the proportions of titanium and nitrogen are appropriate, substantially all titanium occurs in the form of titanium nitride. Any nitrogen not present as titanium nitride apparently is dissolved in the silicide matrix or is combined in non-crystalline form, since X-ray examination reveals no crystalline nitrogen-containing phases except titanium nitride. Metallographic examination shows that the silicide matrix usually is in the form of small grains of the order of 5–10 microns in maximum dimension. The dispersed titanium nitride particles are much smaller, usually one micron or less in maximum dimension. The converted objects usually have low porosity, i.e., below 5%, although this property can be varied considerably by appropriate choice of conversion conditions.

In preparing the compositions of this invention the elements themselves or compounds and alloys thereof can be employed. For example, the compositions can be prepared by heating together molybdenum, silicon, titanium and silicon nitride in such proportions that the final composition falls within the ranges cited above. Alternatively, part or all of the molybdenum may be employed in the form of a molybdenum-silicon alloy. It is also possible to employ titanium silicide or silico-titanium alloys.

When fired compositions or shaped objects are to be prepared, the starting materials should be in the form of a fine powder having substantially all particles less than 75 microns in size and should be thoroughly mixed to insure homogeneity. Compositions particularly useful in the practice of this invention are obtained by grinding together silicon nitride, molybdenum, titanium, and silico-titanium in such proportions that the resulting powder falls within the ranges of composition and particle size described above. Of course, nitrogen deficient powder compositions may be employed and the requisite amount of nitrogen introduced by firing in an atmosphere of nitrogen.

The above compositions are readily shaped by cold-pressing or slip-casting and converted to strong oxidation resistant objects by firing at a temperature of at least 900° C., preferably 1300° C.–1850° C. or above. Such objects are also obtained by hot-pressing, i.e., by simultaneous pressing and firing, the powders at a pressure of at least 1000 p.s.i. and a temperature of 900° C. or above. It is preferred that hot-pressing be carried out at 1300–1700° C. under 2000–5000 p.s.i. pressure. Of course, converted compositions can be prepared in bulk and objects of any desired shape produced therefrom by machining or other conventional metal-working techniques.

Whatever the method of firing, times of 30 seconds to 30 minutes usually suffice to ensure complete conversion of the powder to compositions or shaped objects having the desired high temperature characteristics. Longer periods may be employed if desired without detrimental effect. It is sometimes desirable to carry out a preliminary firing of the powder composition under the conditions described above and then to grind the fired material to fine particle size and again fire in the form of the final object. This procedure results in objects having superior high temperature properties.

When converted compositions and objects are prepared by melt-casting, the particle size of the constituent materials is not critical and thus, massive forms can be employed, the only requirement being that molybdenum, nitrogen, silicon and titanium are present in the proportions defined hereinabove. A temperature sufficient to bring the entire charge to a molten condition must, of course, be employed.

Depending on the properties desired in the converted product, it is sometimes preferred to incorporate a small amount of alkali metal or alkaline earth metal in the powder composition before firing. This procedure is particularly beneficial when converted compositions and objects having considerably higher impact strengths and improved oxidation resistance, generally at the expense of correspondingly lower transverse rupture strengths, are desired. Thus, by incorporating an alkali or alkaline earth metal in the composition before it is fired, a significant and unexpected change in properties is obtained, and this change assumes considerable importance for special high temperature applications where excellent impact strength is the objective and high transverse rupture strength is of secondary importance. This process and the converted composition objects produced thereby constitute preferred embodiments of the invention.

The manner in which the alkaline earth or alkali metal is introduced into the powder composition is not critical. Thus, these metal(s) may be introduced in the dry state either as elements or compounds, or in liquid form as dispersions or solutions. When compounds are used, the alkali or alkaline earth metal should be in the form of a compound of one of the powder constituents, e.g., sodium or lithium molybdate, or a compound which will thermally decompose at firing temperature leaving an oxide or hydroxide residue, e.g., calcium carbonate, lithium acetate, etc. Solutions and dispersions of the elements or compounds are conveniently employed because they readily permit uniform blending with the powder compositions. Of course, the carrier liquid must be volatile and also inert with respect to the powder constituents. Before firing, the volatile liquid present in the powder should be reduced to less than 3% (by weight) to prevent rupture of the object during firing. Preferably, the volatile liquid is one that will be completely vaporized at a temperature less than about 350° C., e.g., water, alcohol or kerosene.

Preferably, an aqueous alkaline solution of an alkali or an alkaline earth metal oxide or hydroxide, e.g., sodium hydroxide, lithium hydroxide, barium hydroxide, or calcium hydroxide, or a compound convertible thereto by heat such as a carbonate or bicarbonate, is employed. Although in certain cases potassium compounds can be used, these ordinarily are not as effective as compounds of sodium or lithium. Sodium compounds are particularly effective. When sodium hydroxide is employed, an oxidation resistant layer of $Na_2MoO_4$ (sodium molybdate) forms on the surface of the object during sintering. When other of the above metal compounds are employed, the corresponding molybdate forms in a similar manner providing an oxidation resistant coating.

The concentration of the alkaline compound in the aqueous solution will usually be in the range of 1–5% by weight although higher concentrations up to the limit of the solubility of the compound can be employed if desired. The concentration chosen depends upon the quantity of alkali or alkaline earth metal desired in the powder after drying. This latter proportion is usually in the range of 0.25–5.0% by weight of the powder compositions, irrespective of the form in which the alkali metal or alkaline earth metal is introduced. However, proportions up to 10% (by weight) can be employed. Objects and compositions prepared from powders treated with an alkaline compound contain up to 10%, generally 0.25–5.0% of alkali or alkaline earth metal.

The use of an alkaline compound or metal as described above results in the formation of converted objects having high impact strength. Usually such objects also are more dense than those prepared without such additives; however, transverse rupture strength is generally lower.

The invention is illustrated in greater detail by the examples which follow. Examples I–XIX illustrate powder compositions and converted objects within the above-defined composition ranges. Examples A–G illustrate other molybdenum-nitrogen-silicon-titanium powders and objects. In all examples, quantites are referred to in parts by weight. Transverse rupture strength was measured using a specimen nominally ¼" x ¼" in cross-section supported symmetrically on parallel ceramic rods ⅛" in diameter and 1" apart. Force was applied at the top center of the portion of the bar between the supports by the edge of a V-shaped member (radius 1/16").

Impact strength was measured by a modification of ASTM Method E 2347T using unnotched specimens 1" x ¼" x ¼" in nominal dimensions. These specimens usually were prepared from pieces resulting from previous transverse rupture tests. In impact testing, half the length of the specimen was unsupported and the point of impact was 0.3" from the support. A 25 inch-pound hammer was usually employed.

EXAMPLE I

Molybdenum powder (21.1 g.), titanium disilicide powder (16.64 g.), and silicon nitride ($Si_3N_4$) powder (5.6 g.) were milled in a 250 cc. porcelain ball mill at 85 r.p.m. for 40 hours to yield a fine mixed powder. Portions of this powder (about 2 g. each) were pelleted by pressing at 80,000 p.s.i. pressure in a cylindrical die, and these pellets were fired in air by placing them in an electric muffle furnace for 2 minutes at various temperatures—800°, 1000°, 1200°, 1300°, 1400°. Smoking (evolution of $MoO_3$) was observed at the two lower temperatures. At the higher temperatures, the pellets reached the furnace temperature within 5–15 seconds, exceeded it considerably within the next few seconds because of the heat of reaction and returned to furnace temperature rapidly (indicating that little oxidation occurred). Hard, metallic pellets resulted which could scarcely be marked with a file. A hard metal bar (density 3.95 g./cc.) was made by pressing the powder at 26,000 p.s.i. in a 1½" x ½" x ¼" mold, then firing in air at 1350° C. for 2 minutes. This bar was heated in air for 16 hours each at 1000°, 1100°, 1200°, 1300° and 1400° and was substantially stable after the initial 1000° treatment.

Another portion of the powder of Example I was hot-pressed for 10 minutes at 1345° C. under 5000 p.s.i. pressure in a graphite bar mold to yield a hard metal bar. This bar exhibited a bulk density of 4.21 g./cc. and an immersion density of 6.14 g./cc., indicating a porosity of about 21%. The transverse rupture strength in air at 1194° C. was 37,950 p.s.i.

EXAMPLE II

A mixture (360 g.) of molybdenum, titanium, silicon nitride and silicotitanium (weight ratios: 16.3/34.3/9.0/40.4) containing the elements in the proportions 16.3% Mo, 3.6% N, 25.6% Si and 54.5% Ti was placed in a one-quart porcelain ball mill containing 800 g. of quartz pebbles. Benzene (200 ml.) was then added and the mixture milled for 72 hours. The mill was opened, the benzene allowed to evaporate and the powdered charge separated from the pebbles. The powder was passed through a 200-mesh screen to insure that substantially all particles were less than 75 microns in size.

A portion of the dry powder was mixed with 5% aqueous sodium hydroxide in the proportion of 30 g. of aqueous sodium hydroxide to 100 g. of powder to form a paste. This paste was air-dried for 18 hours at room temperature and then further dried for 1 hour in a vacuum oven at 115° C. The resulting cake was ground by hand in a porcelain mortar and sieved through a 200-mesh screen.

The sodium hydroxide-treated powder was hot-pressed in a graphite mold for 10 minutes at 1600° C. under 3000 p.s.i. pressure. The wafers so produced were cut with a diamond wheel into bars 1.75" x 0.25" x 0.25" in dimensions. A bar examined by emission spectroscopy showed the presence of Na in the range of 0.5–2.0%. These bars were employed in the as-cut condition for mechanical testing. The results of the tests were as follows:

| Property: | Value |
|---|---|
| Bulk density (g./cc.) | 4.78 |
| Transverse rupture strength (p.s.i.) at— | |
| 25° C | 46,975 |
| 1250° C | 36,721 |
| 1350° C | 20,780 |
| Impact strength (ft. lbs./sq. in.) | [1] 25.7 |
| Knoop hardness— | |
| 10 g | 1829 |
| 100 g | 1137 |
| 1000 g | 1021 |

[1] A converted object made from the same powder composition without use of sodium hydroxide had an impact strength of 1.7 ft. lb./sq. in.

EXAMPLE III

Powder compositions containing 58.7% Mo, 2.2% N, 19.5% Si, and 19.6% Ti were prepared as described in Example II from a mixture of molybdenum, titanium, titanium disilicide and silicon nitride (weight ratios: 58.6/5.7/30.3/5.4). The mechanical properties of hot-pressed objects prepared from these powder compositions were as follows:

| Property: | Value |
|---|---|
| Bulk density (g./cc.) | 5.76 |
| Transverse rupture strength (p.s.i.) at— | |
| 25° C | 38,240 |
| 1250° C | 29,912 |
| 1350° C | 25,753 |
| Impact strength (ft. lbs./sq. in.) | 10.67 |

The objects contained, by emission spectroscopy, in the range of 0.5–2.0% Na.

EXAMPLE IV

A mixture of molybdenum, silicon nitride, silico-titanium and titanium (weight ratios: 24.2/8.1/17.9/49.8) containing the elements in the proportions of 24.2% Mo, 3.3% N, 14.5% Si, and 58% Ti was prepared, treated with sodium hydroxide solution and hot-pressed to 2"

diameter wafers as described in Example II. The wafers were broken up in an iron mortar and the fragments placed in a one-quart porcelain ball mill with 800 g. of quartz pebbles and 250 ml. of benzene. The mixture was ball-milled for 144 hours. The mill was then opened, the benzene allowed to evaporate and the powder separated from the pebbles.

The powder was hot-pressed for 10 minutes at 1600° C. under 3000 p.s.i. pressure to form wafers from which test specimens were prepared as described in Example I. These specimens had the following properties. Transverse rupture strength at 25° C., 75,720 lb./sq. in.; at 1250° C., 35,919 lb./sq. in.; at 1350° C., 20,476 lb./sq. in.; the impact strength at room temperature was 23.9 ft. lb./sq. in.

EXAMPLES V–XIV

These examples illustrate the preparation of molybdenum-nitrogen-silicon-titanium powders and converted compositions from a number of starting materials used in various proportions. The general procedure was as described in Example II and sodium hydroxide solution was employed to moisten the powder composition before forming. Details of the compositions employed are disclosed in Table I and the physical properties of the alloy products are summarized in Tables II and III.

*Table I*

| Example | Raw Materials (Weight ratio) | Ratio Mo-N-Si-Ti |
|---|---|---|
| V | Mo, TiSi$_2$, Si$_3$N$_4$ (22/48/30) | 22-12-44-22 |
| VI | Mo, Si, TiSi$_2$, Si$_3$N$_4$ (37.9/7.9/41.1/13.1) | 38-5-38-19 |
| VII | Mo, TiSi$_2$ Si$_3$N$_4$ (36/39/25) | 36-10-36-18 |
| VIII | Mo, Ti, TiSi, Si$_3$N (23.7/34.0/29.2/03.1) | 23.7-5.1-23.7-47.5 |
| IX | Mo, TiSi$_2$, Si$_3$N$_4$ (47.8/41.5/10.7) | 48.0-4.2-28.8-19 |
| X | Mo, TiSi$_2$, Ti, Si$_3$N (37.5/17.3/29.6/15.6) | 37.5-6.25-18-75-37.5 |
| XI | Mo, Ti, Si$_3$N$_4$, silico-titanium (14.5/41.6/8.1/35.8) | 14.5-3.3-24.2-58 |
| XII | Mo, Ti, Si, TiSi$_2$, Si$_3$N$_4$ (20.2/36.4/6.7/31.1/5.6) | 20.2-2.2-26.9-50.7 |
| XIII | Mo, Ti, Si$_3$N$_4$, TiSi$_2$ (30.7/37.7/5.5/26.1) | 30.6-2.1-17.3-50 |
| XIV | Mo, TiSi$_2$, Si, Si$_3$N$_4$ (48.9/42.4/3.4/5.4) | 49-2.2-29.4-19.4 |

*Table II*

| Example | Transverse Rupture Strength (p.s.i.) | | | |
|---|---|---|---|---|
| | 25° C. | 1,250° C. | 1,350° C. | 1,500° C. |
| V | 59,800 | 6,000 | | |
| VI | 47,400 | | | |
| VII | 39,600 | 32,500 | | |
| VIII | 35,800 | 40,600 | 42,200 | |
| IX | 36,600 | 25,700 | 11,000 | |
| X | 26,500 | 40,600 | 39,200 | 14,200 |
| XI | | | 25,700 | 20,200 |
| XII | 22,000 | 37,400 | | |
| XIII | 23,100 | | 23,400 | |
| XIV | 42,700 | 34,100 | 42,500 | 20,100 |

*Table III*

| Example | Impact Strength (ft. lb./sq. in.) | Bulk Density (g./cc.) |
|---|---|---|
| V | 11.1 | 3.83 |
| VI | 20.7 | 4.85 |
| VII | 23.2 | 4.48 |
| VIII | 7.5 | 5.04 |
| IX | 25.4 | 5.04 |
| X | 11.2 | 5.63 |
| XI | 19.11 | 4.84 |
| XII | 21.8 | 4.63 |
| XIII | 16.7 | 5.33 |
| XIV | 27.8 | 5.46 |

Products of Examples V and VI contained 0.5–2% Na by emission spectroscopy. In Example V the Knoop hardness values were determined and found to be 1901/10 g. load; 1358/100 g. load; 1009/1000 g. load. Products made from this powder composition without NaOH had a bulk density of 3.66 g./cc., an impact strength of 3.6 ft. lb./sq. in. and transverse rupture strengths of 15,200 p.s.i. at 1250° C. and 70,500 p.s.i. at 25° C. Products prepared from the powder of Example VI without NaOH had an impact strength of 7.6 ft. lb./sq. in. and a transverse rupture strength of 59,100 p.s.i. at 25° C.

EXAMPLES XV–XVII

These examples illustrate the oxidation resistance of converted objects prepared in accordance with this invention. The objects were prepared according to the general procedure of Example II. Sodium hydroxide solution was used to moisten the powder compositions of Examples XVI and XVII prior to alloy formation; the composition of Example XV was converted by hot-pressing without prior moistening. Oxidation resistance of the products was measured using bars ½" x ¼" x ¼" in dimensions which were heated in an electric muffle furnace successively at 900°, 1000°, 1100°, 1200°, 1300°, 1400° and 1500° C. for 16 hours at each temperature. After each 16-hour period of heating, the bars were cooled to room temperature, weighed and measured. The weights and measurements were compared with the values determined before the initial heating period and the cumulative changes which had occurred were recorded. Details of the compositions employed are shown in Table IV and the results of the oxidation resistance measurements are shown in Table V. A cutting tool fabricated from the product of Example XV was entirely satisfactory for machining a difficultly machinable chromium-nickel-cobalt alloy.

*Table IV*

| Example | Raw Materials (Weight Ratio) | Ratio Mo-N-Si-Ti |
|---|---|---|
| XV | Mo, TiSi$_2$, Si$_3$N$_4$ (48.7/38.4/12.9) | 48.7-5.2-28.5-17.7 |
| XVI | Mo, TiSi$_2$, Si$_3$N$_4$ (49.1/38.1/12.8) | 49.0-5.1-28.4-17.6 |
| XVII | Mo, Ti, Si$_3$N$_4$, Silico-titanium (16.3/34.4/9.0/40.3) | 16.3-3.6-27.2-52.9 |

*Table V*

[Percent growth in air,[1] 16 hours at each temperature (cumulative)]

| Example | 900° C. | | 1,000° C. | | 1,100° C. | | 1,200° C. | | 1,300° C. | | 1,400° C. | | 1,500° C. | |
|---|---|---|---|---|---|---|---|---|---|---|---|---|---|---|
| | Wt. | Dimen. | Wt. | Dimen. | Wt. | Dimen. | Wt. | Dimen. | Wt. | Dimen. | Wt. | Dimen. | Wt. | Dimen. |
| XV | | | 0.04 | 0.79 | 0.10 | 0.41 | 0.09 | 0.41 | 0.14 | 0.71 | 0.18 | 0.76 | −3.29 | 1.91 |
| XVI | 0.04 | −0.05 | 0.006 | −0.10 | 0.12 | −0.07 | 0.28 | 0.01 | 0.53 | 0.15 | 0.58 | 0.33 | 0.32 | |
| XVII | 0.54 | 1.56 | 1.13 | 3.11 | 2.25 | 4.14 | 3.08 | 5.41 | 0.68 | 5.39 | 3.67 | 5.70 | 0.32 | 9.08 |

[1] Cumulative percentage change (based on initial value) in weight (Wt.) and dimension (Dimen.) after exposure to the indicated temperature. The change in dimension shown is the average for the three dimensions.

In Example XV, the first stage of heat treatment was 1000° C. The Knoop hardness values before heating in air were 1829/10 g. load; 1137/100 g. load; 1021/1000 g. load. Analysis shows the product of Example XV to contain 4.82% N after the oxidation test. X-ray shows presence of $MoSi_2$, TiN, and other unidentified phases.

EXAMPLE XVIII

Molybdenum, silicon nitride, titanium disilicide and titanium in the form of commercially available powders were mixed in the proportions by weight of 47.0:15.0:18.2:19.8. The mixture contained Mo-N-Si-Ti in the proportions by weight of 47.0:6.0:18.8:28.2. To insure thorough mixing, the powder mixture was suspended in benzene to form a thin slurry which was agitated in a shearing type mixer for 15 minutes and the benzene was then allowed to evaporate. The powder was passed through a 200-mesh sieve leaving no residue.

A portion of the powder composition, prepared as described above, was pressed at 25,000 p.s.i. and then fired at 1700° C. for one hour in an atmosphere of argon. The fired object had a density of 5.99 g./cc. Analysis gave the following results: Found—Mo, 51.23; N, 4.83; Si, 13.0; Ti, 27.18; others (by difference), 4.76.

A bar was produced from a powder composition prepared as described above by hot-pressing at 1600° C. under 3000 p.s.i. pressure. This bar was arc-melted in an argon atmosphere using a current of 160 amperes. The bar was contained in a water-cooled copper crucible and a non-consumable water-cooled tungsten electrode was employed. After melting, the melt was allowed to solidify and the button produced was turned and remelted several times. The product had a density (average of four determinations) of 4.69 g./cc. and Knoop hardness values (average of five determinations) of 963 (1000 g. load), 1299 (100 g. load), and 1793 (10 g. load). Another button having somewhat higher density (6.02 g./cc., average of four determinations) was prepared by arc-melting the powder composition in the form of an unfired rod ⅜" in diameter formed by pressing the powder at room temperature under 44,000 p.s.i.

EXAMPLE XIX

A molybdenum-nitrogen-silicon-titanium composition containing the elements in the proportions, by weight, of 49:5:28:18 was prepared by rolling a mixture of molybdenum, titanium disilicide and silicon nitride in a porcelain ball mill with alumina pebbles and benzene. After rolling for 72 hours at 67 r.p.m., the slurry was removed from the mill, the benzene evaporated, and the powder further dried in vacuum at 110° C. for 2 hours. The dry powder was sieved to remove any material which would not pass a 200-mesh screen. Electron micrographs of the powder showed that all particles were less than 4 microns in maximum dimension. It was observed further that 90% of the particles were 2 microns or less and that 40% were 0.25 or less in maximum dimension.

Several fired bars were prepared from the above powder by first compacting the powder in a bar mold under a pressure of 80,000–100,000 p.s.i. and then firing at 1700° C. for 5 minutes in an argon atmosphere. Chemical analysis of one such bar gave the following results: Found—Mo, 45.45; N, 3.45; Si, 23.42; Ti, 18.14. In addition to the above constituents, spectrographic analysis showed the presence of more than 3% Al, 0.1–1% Fe, less than 0.5% Cr and K, and less than 0.25% Mn, Ca, Ba, Ni, Zr, Sr, and Na (0.03–0.15%). Traces (i.e., less than 0.05%) of Mg, Cu, B, and Li were also observed.

The bars, after firing, had transverse rupture strengths of 33,000–45,000 lb./sq. in. at 1200° C.

Mo-N-Si-Ti compositions and converted objects which are outside the above-defined ranges of composition are summarized in Table VI. The results of the experiments summarized in this table illustrate deleterious effects on high temperature characteristics when compositions containing molybdenum, nitrogen, silicon and titanium in proportions outside those of the invention are employed.

*Table VI*

OTHER Mo-N-Si-Ti COMPOSITIONS [1]

| Example No. | Ingredients (Proportion by Weight) | Mo-N-Si-Ti (Proportion by Weight) | Alkaline Treatment [2] | Bulk Density (g./cc.) |
|---|---|---|---|---|
| A | Mo, $TiSi_2$, $Si_3N_4$ | 65.5–3.43–19.19–11.88 | No | 5.10 |
| B | Mo, Ti, $Si_3N_4$ | 28.6–14.2–28.6–28.6 | No | 3.15 |
| C | Mo, Si, $TiSi_2$ | 30.0–0.0–40.0–30.0 | Yes | 4.74 |
| D | Mo, Si, $TiSi_2$, $Si_3N_4$ | 42.2–6.2–42.2–9.4 | Yes | 4.52 |
| E | Mo, Ti, $Si_3N_4$, silico-titanium | 14.3–4.9–14.3–66.5 | Yes | >4.84 |
| F | Mo, Ti, Si, $TiSi_2$, $Si_3N_4$ | 9.8–1.8–44.2–44.2 | Yes | 4.10 |
| G | Mo, $TiSi_2$, $Si_3N_4$ | 16.0–20.0–48.0–16.0 | No | 2.77 |

| Example No. | Transverse Rupture Strength (lb./sq. in.) 25° C. | Transverse Rupture Strength (lb./sq. in.) 1,350° C. | Impact Strength (ft. lb./sq. in.) | Other Properties |
|---|---|---|---|---|
| A | 18,900 | [5] 37,600 | 5.0 | Knoop Hardness Number: 10 g.—852. 100 g.—687. 1,000 g.—409. |
| B [4] | 6,800 | [3] 2,000 | 0.8 | Failed at 1,400° C. in oxidation test. |
| C | 24,300 | 26,100 | 3.7 | |
| D | 42,700 | 2,200 | 9.2 | |
| E | 12,400 | 21,800 | 6.5 | Do. |
| F | 28,700 | 6,500 | 13.6 | |
| G | 9,600 | [3] 13,600 | 7.4 | Poor oxidation stability above 1,300° C. |

[1] The general procedure of Example II was employed except that in Example A no benzene was used during ball-milling.
[2] In examples C–F, the powder was treated with 30% (by weight based on powder weight) of 5% aqueous sodium hydroxide solution corresponding to 1.5% NaOH based on total composition (dry basis).
[3] At 1,250° C.
[4] Similar properties were obtained after alkaline treatment of the powder composition.

Although the new products of this invention are principally composed of molybdenum, silicon, titanium and nitrogen, other metals and inert diluents that do not materially affect the basic and novel characteristics of the converted compositions and objects can be present as stated hereinabove. Preferably, molybdenum, nitrogen, silicon and titanium constitute at least 90% of the untreated compositions and converted products. Compositions containing at least 95% of these elements are preferred because of the superior quality of the converted compositions and shaped objects obtained therefrom.

Examples of impurities usually found in minor amounts in the starting materials employed, i.e., in powdered molybdenum, silicon, titanium silicotitanium, titanium disilicide, and the like include iron, aluminum, carbon, copper, manganese, and chromium as well as metal oxides from erosion of porcelain ball mills. It is preferred that the starting materials contain as little of these impurities as possible, preferably less than 10% by weight. The starting materials employed in the examples above were of the usual commercial purity.

The converted compositions and shaped objects of this invention do not contain appreciable amounts of elemental molybdenum, silicon or titanium, although these may constitute a considerable part of composition before conversion. This is very desirable since titanium and molybdenum are generally not stable to high temperature oxidation and elemental silicon is brittle. Some oxidation of the fired or melt-cast compositions and objects, particularly when these are porous, may occur on prolonged heating at high temperature. However, this oxidation is not extensive as shown by the small weight gain on heating in air and does not materially weaken the structure. After extended heating at high temperature, i.e., after heating for a period considerably longer than required to convert the untreated composition at the usual conversion temperature, complex oxides of molybdenum, silicon and titanium may be present in minor amounts, i.e., up to about 10%.

Preferably the powders employed in this invention are obtained by milling or dry-grinding by conventional methods until the desired particle size is achieved. The progress of particle size reduction can be followed by usual microscopic techniques. Although such powders may contain up to 5% by weight of particles coarser than 75 microns and converted objects satisfactory for some purposes can be prepared therefrom, it is preferred that less than 2% of such coarse particles be present. It is still better to screen out all coarse grains since they serve as points of chemical and mechanical inhomogeneity. Commercial powdered forms of molybdenum, titanium, molybdenum silicide, titanium disilicide, and silicon nitride which are available with primary particle sizes less than 5 microns and silico-titanium which is usually much coarser (8–200 mesh) are suitable for use in preparing the compositions of this invention.

It is preferred that the final converted shaped objects be at least 1 mm. in minimum dimension since thin objects are not only difficult to obtain but if obtainable have low structural strength, and when shaped prior to firing, are more subject to oxidation during firing than thicker objects. Of course, as indicated above, it is sometimes desirable to convert the powder composition, grind the converted composition and produce the final object by refiring the ground converted powder. When this is done, it may be desirable for ease in grinding that the thickness of the intermediate converted object, e.g., a wafer, be less than 1 mm.

In the examples, conversion of untreated compositions by hot-pressing, cold pressing and sintering and by melting and casting has been described. To obtain optimum properties in the final product, it is preferred that the heating, if in air, be rapid. However, if a liquid has been employed in preparing the powder for firing, the initial rate of heating, i.e., up to about 350° C. must be slow to permit drying without cracking. After a temperature of about 350° C. is reached, heating to the conversion temperature should be as rapid as possible since slow heating in this range brings about powdering, expansion and cracking of the alloy object.

The properties of the converted compositions of this invention give them utility in diverse applications. Their thermal stability coupled with electrical resistance in the range of conventional resistance wires and graphite renders them useful in the preparation of electric heating elements. Their hardness and ease of fabrication make them useful in the preparation of tools for cutting and sharpening operations. The products can also be prepared in the form of grit and used in the preparation of bonded abrasive wheels and brazed grit surfaces on metal sheets.

A particularly important characteristic of the converted objects of this invention is inherent lubricity at elevated temperatures. This property, coupled with excellent high temperature properties, renders the converted products outstanding as materials of construction for extrusion die nibs. High inherent lubricity appears to be augmented by the presence of oxides introduced as hereinbefore described. Use of an alkali metal compound during shaping of the powder composition also appears to improve lubricity.

The ease of fabrication of shaped objects is a particular advantage which favors the use of the converted compositions e.g., as structural components of high temperature furnaces and heat engines. Furthermore, the ingredients for the powder compositions of this invention are commercially available from domestic sources.

Although most of the foregoing discussion of the compositions and their utility has been centered around the excellent high temperature characteristics of the fired and melt-cast compositions and articles, it is to be understood the utility of these products is not limited to high temperature applications. They may also be used at room temperature or any other temperature below 1000° C. However, the primary contribution of the products of the invention to the structural material arts resides in their heretofore unattainable combination of high temperature properties.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition of matter consisting essentially of molybdenum, nitrogen, silicon and titanium in the proportions, by weight, of 14–65% molybdenum, 1–12% nitrogen, 14–45% silicon, and 15–59% titanium.

2. A composition of claim 1 wherein the molybdenum, nitrogen, silicon, and titanium are homogeneously combined in the form of powder having substantially all particles less than 75 microns in size and containing 0.5–10%, by weight, of at least one member selected from the group consisting of an alkali metal and an alkaline earth metal.

3. A composition of matter consisting essentially of, by elemental analysis, molybdenum, nitrogen, silicon, and titanium in the proportions, by weight, 14–65% molybdenum, 1–12% nitrogen, 14–45% silicon and 15–59% titanium and, by phase analysis, a matrix of molybdenum disilicide and $(Mo, Ti)_5Si_3$ containing titanium nitride dispersed therein.

4. A composition of matter consisting essentially of, by elemental analysis, molybdenum, nitrogen, silicon, and titanium in the proportions, by weight, 14–65% molybdenum, 1–12% nitrogen, 14–45% silicon and 15–59% titanium and, by phase analysis a matrix of $(Mo, Ti)_5Si_3$ containing titanium nitride and molybdenum disilicide dispersed therein.

5. A composition of matter consisting essentially of, by elemental analysis, molybdenum, nitrogen, silicon, and titanium in the proportions, by weight, 14–65% molybdenum, 1–12% nitrogen, 14–45% silicon and 15–59% titanium and, by phase analysis a matrix of $(Mo, Ti)_5Si_3$ containing molybdenum disilicide, titanium nitride and $(Mo, Ti)Si_2$ dispersed therein.

6. A composition of matter consisting essentially of, by elemental analysis, molybdenum, nitrogen, silicon, and titanium in the proportions, by weight, 14–65% molybdenum, 1–12% nitrogen, 14–45% silicon and 15–

59% titanium and, by phase analysis, a matrix of molybdenum disilicide and $(Mo, Ti)_5Si_3$ containing titanium nitride and $(Mo, Ti)Si_2$ dispersed therein.

7. A hard, strong, creep-resistant and oxidation-resistant article of manufacture composed of the composition of claim 1.

8. A composition of matter which is hard, creep-resistant, oxidation-resistant, impact-resistant and resistant to transverse rupture at high temperatures, and which consists essentially of, by elemental analysis, molybdenum, nitrogen, silicon and titanium in the proportions, by weight, 14–65% molybdenum, 1–12% nitrogen, 14–45% silicon and 15–59% titanium.

9. A composition of claim 8 wherein molybdenum, nitrogen, silicon and titanium constitute at least 90% of the composition by weight.

10. An article of manufacture which is hard, creep-resistant, oxidation-resistant, impact-resistant and resistant to transverse rupture at temperatures above 1000° C., and which consists essentially of, by elemental analysis, molybdenum, nitrogen, silicon and titanium in the proportions, by weight, 14–65% molybdenum, 1–12% nitrogen, 14–45% silicon and 15–59% titanium.

References Cited in the file of this patent

UNITED STATES PATENTS

| | | |
|---|---|---|
| 2,939,785 | Weatherly et al. | June 7, 1960 |

FOREIGN PATENTS

| | | |
|---|---|---|
| 181,431 | Austria | Aug. 15, 1954 |
| 869,912 | Great Britain | June 7, 1961 |